United States Patent [19]

Eklund et al.

[11] Patent Number: 4,990,036

[45] Date of Patent: Feb. 5, 1991

[54] CUTTING INSERT

[75] Inventors: Sven L. Eklund; Kaj-Ragnar Loqvist; Karl-Erik Forsberg, all of Fagersta, Sweden

[73] Assignee: Seco Tools AB, Fagersta, Sweden

[21] Appl. No.: 259,316

[22] Filed: Oct. 18, 1988

[30] Foreign Application Priority Data

Oct. 19, 1987 [SE] Sweden .................................. 8704055

[51] Int. Cl.[5] .............................................. B23B 1/00
[52] U.S. Cl. ..................................... 407/113; 407/114; 407/115; 407/116
[58] Field of Search ............... 407/113, 114, 115, 116, 407/117, 119, 120, 69, 1

[56] References Cited

U.S. PATENT DOCUMENTS

| | | | |
|---|---|---|---|
| 3,574,911 | 4/1971 | Penoyar | 407/114 |
| 4,552,492 | 11/1985 | Komanduri | 407/114 |
| 4,572,042 | 2/1986 | Wiman | 407/114 |
| 4,575,888 | 3/1986 | Muren | 407/114 |
| 4,616,962 | 10/1986 | Ushijima | 407/113 |
| 4,645,384 | 2/1987 | Shimomura et al. | 407/42 |

Primary Examiner—Frederick R. Schmidt
Assistant Examiner—Blynn Shideler
Attorney, Agent, or Firm—Burns, Doane, Swecker & Mathis

[57] ABSTRACT

A cutting insert simultaneously performs a plurality of operations such as roughing and finishing, or roughing and polishing. A roughing/finishing insert has a main cutting edge and a secondary cutting edge, both edges extending laterally relative to a direction of feed of the insert. The secondary cutting edge is disposed rearwardly of the main cutting edge and extends farther laterally outwardly than the main cutting edge by a distance which is substantially less than the lateral extent of the main cutting edge.

7 Claims, 5 Drawing Sheets

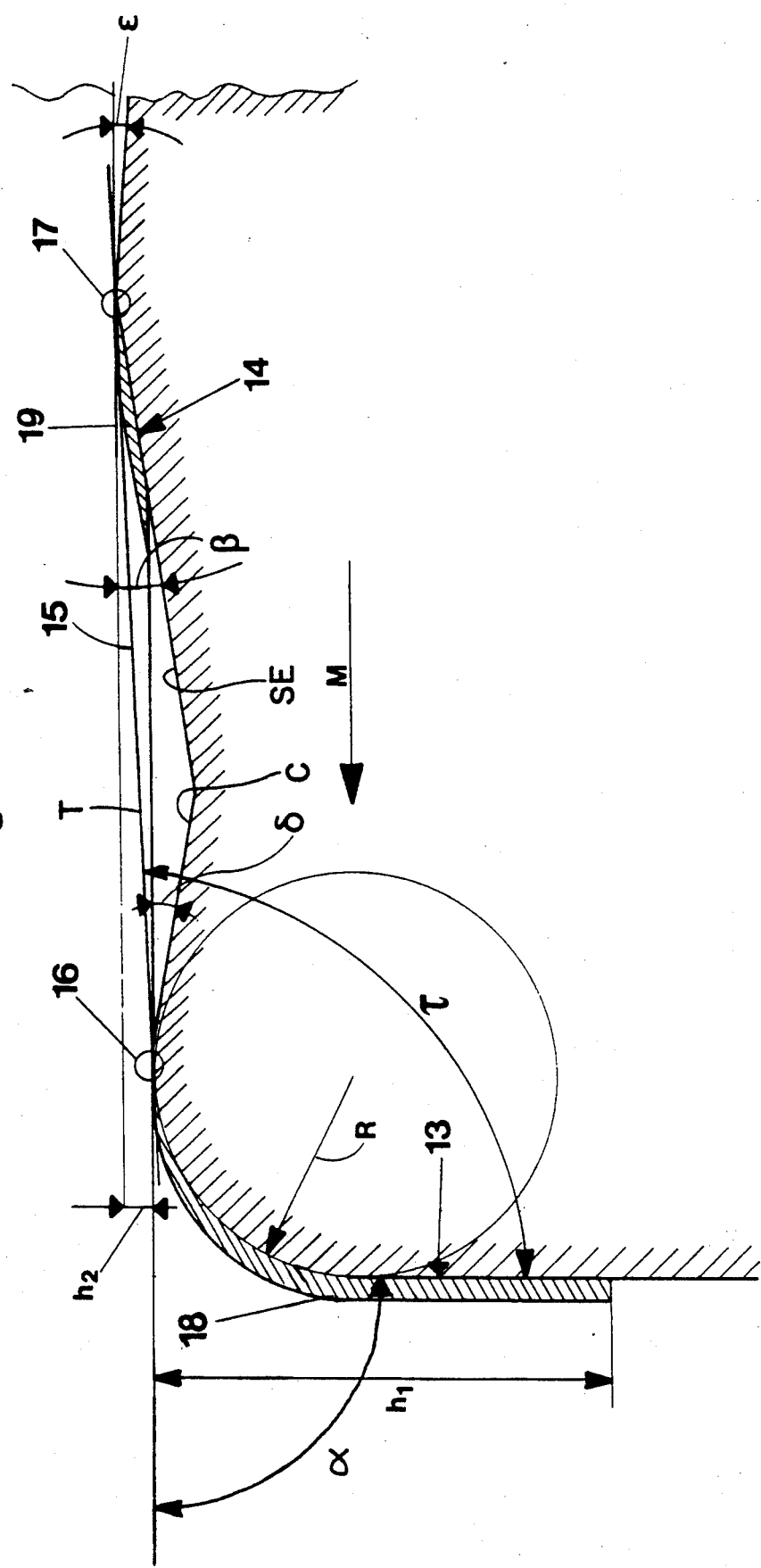

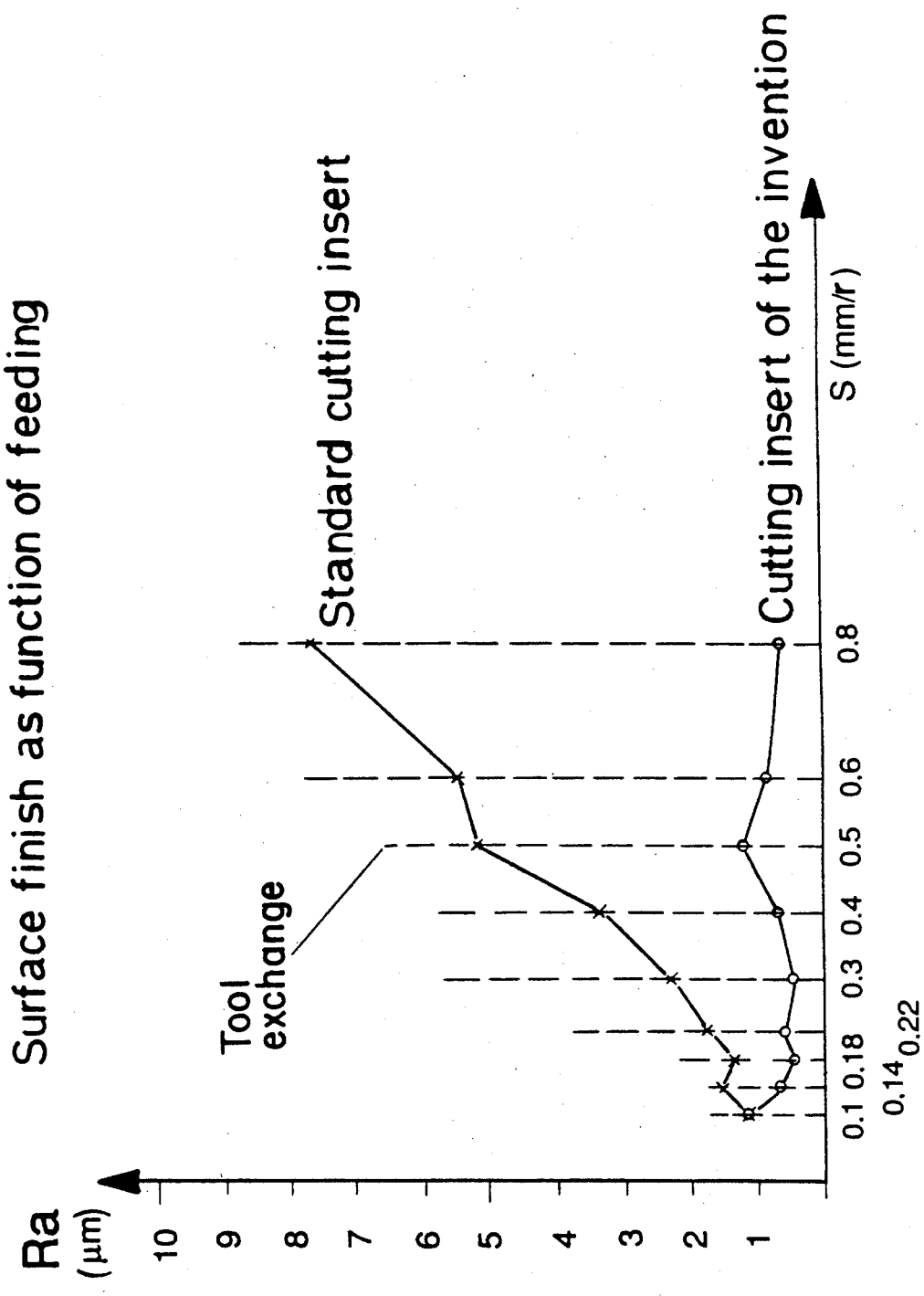

CUTTING INSERT

BACKGROUND AND OBJECTS OF THE INVENTION

The present invention relates to a cutting insert for chip removing machining, preferably turning or drilling, the cutting insert having at least one cutting corner including a main cutting edge.

During turning operations, the machining according to the prior art normally is carried out by one or more cutting inserts for rough machining. The machining is completed by a finishing cutting insert. This is necessary since the roughly turned surface does not have a sufficient finish and roundness.

It is at once realized that such a machining in several steps using different tools is both expensive and time-consuming.

The present invention has the aim of disclosing a cutting insert of the type defined above, the cutting insert in e.g. longitudinal turning simultaneously carries out roughing and finishing cuts or alternatively a finishing cut and polishing, or alternatively roughing and finishing cuts and polishing.

The aim of the present invention is realized by a cutting insert that simultaneously forms a plurality of operations such as roughing or finishing, or roughing and polishing. A roughing/finishing insert has a main cutting edge and a secondary cutting edge at a cutting corner, both edges extending laterally relative to a direction of feed of the insert. The secondary cutting edge is disposed rearwardly of the main cutting edge closely adjacent the corner and extends farther laterally outwardly than the main cutting edge by a distance which is substantially less than the lateral extent of the main cutting edge. A roughing/polishing insert has a burnishing edge instead of a secondary cutting edge.

THE DRAWINGS

Embodiments of the invention will be described below, reference being made to the accompanying drawings where FIG. 1 shows a cutting insert according to the invention in operative position in longitudinal turning;

FIG. 2 shows a detail of the cutting insert according to FIG. 1;

FIG. 5 shows a diagram of the variation of the surface finish relative to the feed speed of a cutting insert according to the invention compared to a conventional cutting insert;

DESCRIPTION OF PREFERRED EMBODIMENTS OF THE INVENTION

Figure 1:
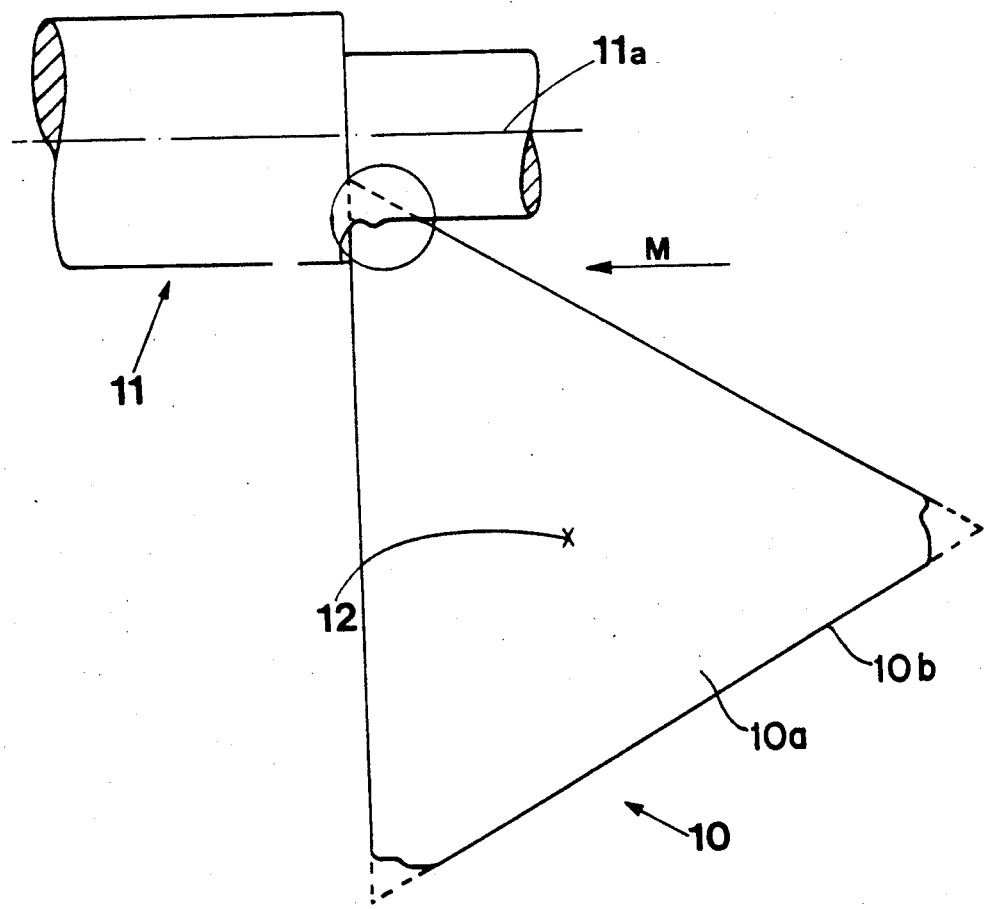

The cutting insert 10 schematically shown in FIG. 1 has in the disclosed embodiment a triangular basic shape. However, within the scope of the invention it is possible to have other basic shapes, e.g. rombic.

The indexable insert 10 is mounted in a holder (not shown). A workpiece 11 is machined by the indexable insert 10, the workpiece 11 being rotated around its longitudinal center axis 11a. The feeding direction of the insert 10 is designated by M.

The encircled portion A of FIG. 1 is shown more in detail in FIG. 2.

As can be learned from FIG. 2 the indexable insert 10 includes an upper surface 10a and an opposite lower surface (not shown) which are interconnected by side surface 10b to form at least one cutting corner having a main cutting edge 13 and a secondary cutting edge which extend laterally relative to the feed direction M. Those cutting edges are oriented non-parallel to one another.

In the disclosed embodiment the straight portion of the main cutting edge 13 has a setting angle $\alpha$ of 90°. A clearance angle $\delta$ formed between a clearance portion C and a tangent line T (which is tangent to a terminal end point 16 of a curved portion of the main cutting edge) can vary within relatively wide limits. In the disclosed embodiment $\delta = 5°$. The cutting depth for the main cutting edge is designated by $h_1$ and the nose radius is designated by R. The magnitude of the nose radius should be in the interval of 0.2–3.2 mm.

A laterally outermost point 17 of the secondary cutting edge is disposed farther laterally outwardly than a laterally outermost point 16 of the main cutting edge by a distance $h_2$ which constitutes the cutting depth of the secondary cutting edge. The lateral direction is defined with reference to a center axis 12 of the insert, i.e., the point 17 is laterally farther from the center than the point 16. The distance $h_2$ is substantially less than the lateral extent of the main cutting edge which, as depicted in FIG. 2, extends at least as far as the cutting depth $h_1$.

The cutting depth $h_2$ of the secondary cutting edge 14 is smaller than 0.5 mm and preferably in the magnitude of 0.03 mm. In this connection it should be pointed out that if the main cutting edge 13 produces a rough machined surface having a distinct wave shape it is possible within the scope of the invention to have a negative cutting depth of the secondary cutting edge, i.e. the peaks of the waves are not completely removed. The secondary cutting edge 14 lies on an edge portion SE which is intersected by the tangent line T. Thus, the main and secondary cutting edges lie on opposite sides of the tangent line.

The setting angle of the secondary cutting edge 14 is designated by $\beta$ and should have a magnitude of 3° although also bigger setting angles are possible.

The clearance angle E of the secondary cutting edge 14 should be smaller than 2°. In the disclosed embodiment $E = 15'$.

In FIG. 2 is also drawn a line 15 that touches the cutting corner at a point 16 and also passes through the end point 17 of the secondary cutting edge 14 being located furthest away from the main cutting edge 13. The line 15 is denominated machining line. The angle that is included between the line 15 and the straight portion of the main cutting edge 13 is designated by $\tau$.

The length of the line 15 between the points 16 and 17 is within the interval 0.1–4 mm, preferably 0.5–2 mm, e.g. 1 mm.

Figure 3:
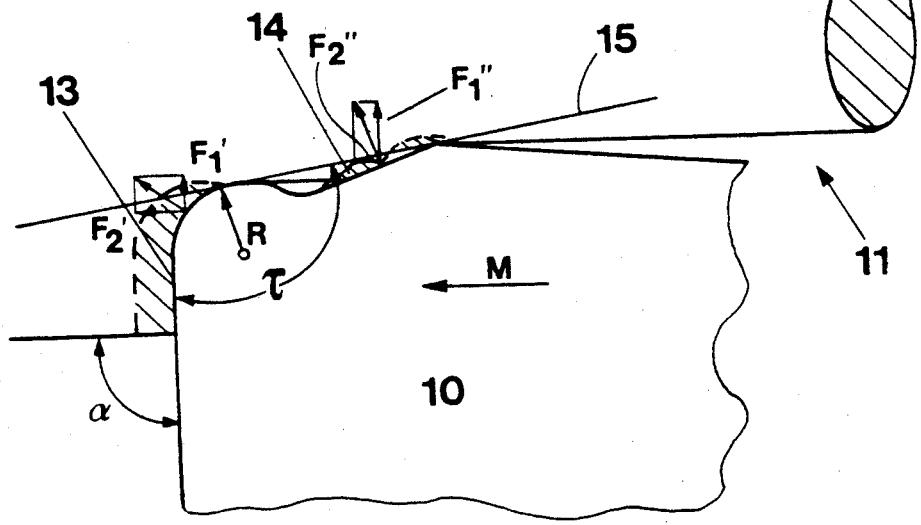
FIG. 3 shows the radial forces that act upon the cutting insert in longitudinal turning.

By viewing FIG. 3 it is realized that the smaller the nose radius R the smaller is the radial force $F_1'$. When it comes to the radial force $F_1''$ the setting angle $\beta$ of the secondary cutting edge 14 is indeed relatively small. However, also the cutting depth $h_2$ of the cutting edge 14 is small. This means that the magnitude of the radial force $F_1''$ is relatively seen small.

Figure 4:
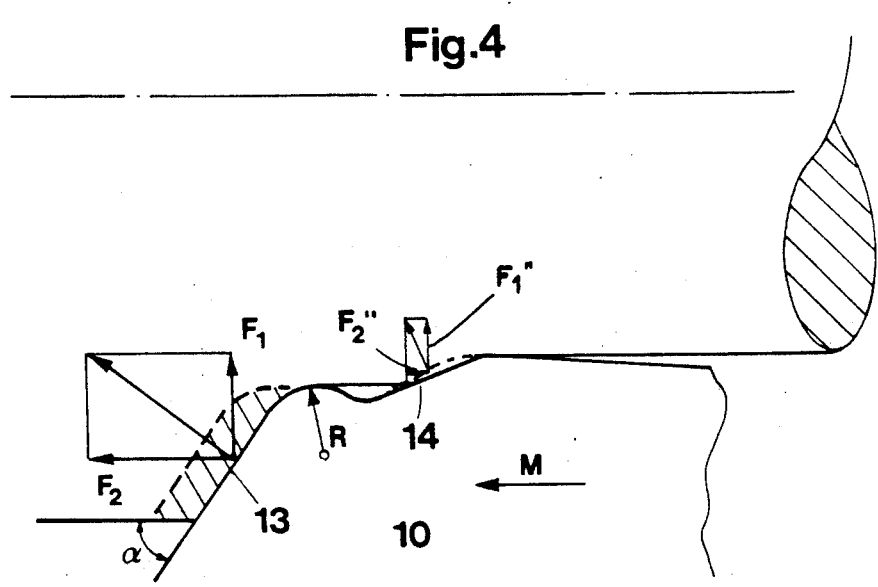
FIG. 4 shows the radial forces in an alternative embodiment of the cutting insert according to the invention.

As is apparent from FIG. 4 the invention is also applicable for an insert having a setting angle $\alpha$ different from 90°. If the setting angle $\alpha$ is smaller than 90° a bigger radial force $F_1$ for the main cutting edge 13 is achieved. Within the scope of the invention it is also possible that the setting angle $\alpha$ of the main cutting edge 13 could be somewhat bigger than 90°. In such a case the radial forces acting upon the straight portion of the main cutting edge 13 would compensate for the radial forces acting upon the curved portion of the main cutting edge and/or the radial forces acting upon the secondary cutting edge.

According to the invention the angle $\tau$ and the setting angle $\alpha$ together have a value within the interval of 177°–210°, preferably 177°–195°.

The cutting insert according to the present invention functions in the following way.

In longitudinal turning, see FIG. 2, a chip 18 of normal appearance is achieved at the main cutting edge 13 while the secondary edge 14 produces a very thin chip 19. At a feeding speed of 0.2 mm per revolution a primary chip 18 of about 0.2 mm thickness is received while the secondary chip 19 only is 0.02 mm thick. This in combination with a relatively small clearance angle of the secondary cutting edge 14 brings about that the surface finish when using a cutting insert according to the present invention is essentially improved compared to a conventional cutting insert.

In this connection it should be noted that the principal of design including a secondary cutting edge brings about that the surface finish is far more independent of the feed speed per revolution than for conventional cutting inserts having no secondary cutting edges.

In FIG. 5 a diagram is disclosed. From this diagram the improved surface finish, in the form of the average surface deviation "$R_a$", can be learned for a cutting insert according to the present invention as compared to a conventional insert having no secondary cutting edge as depicted in broken lines in FIG. 1. The speed S is indicated in units of mm per revolution. Worn tools were replaced at the point designated as "tool exchange" in FIG. 5.

As is apparent from the diagram according to FIG. 5 a drastic improvement of the surface finish is achieved, especially for high feed speeds.

Figure 6:
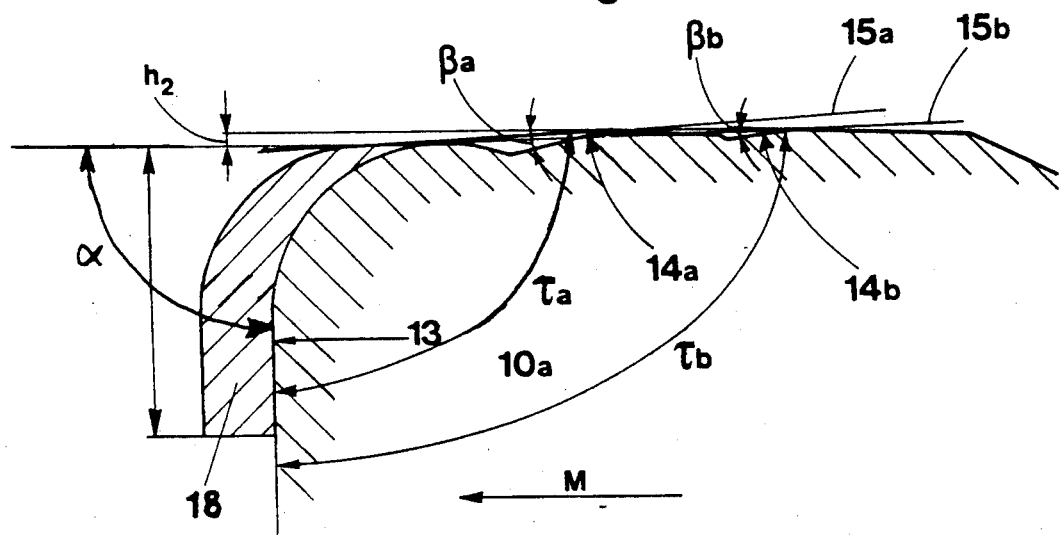
FIG. 6 shows an alternative embodiment of a cutting insert according to the present invention.

The embodiment shown in FIG. 6 of a cutting insert 10a according to the invention is modified compared to the cutting insert 10 described above by having two secondary cutting edges 14a, 14b provided behind the main cutting edge 13, seen in the feeding direction M. As can be seen from FIG. 6 the setting angles $\alpha_a$ and $\alpha_b = 3°$ for both secondary cutting edges 14a, 14b. Preferably the secondary cutting edge 14b can have a further cutting depth of 1/100 mm compared to the secondary cutting edge 14a.

The angles $\tau_a$ and $\tau_b$ are included between the straight portion of the main cutting edge 13 and the machining lines 15a and 15b respectively.

When more than one secondary cutting edge is arranged the above given values for the clearance angle $\epsilon$ also apply to the secondary cutting edge located furthest away from the main cutting edge.

Within the scope of the invention more than two secondary cutting edges are possible.

Within the scope of the invention it is also possible that the secondary edge 14 has no cutting function but only a polishing function. In that case it is denominated burnishing means. It is of course also possible to arrange in a cutting corner one or more secondary cutting edges in combination with one or more burnishing means.

Figure 7:
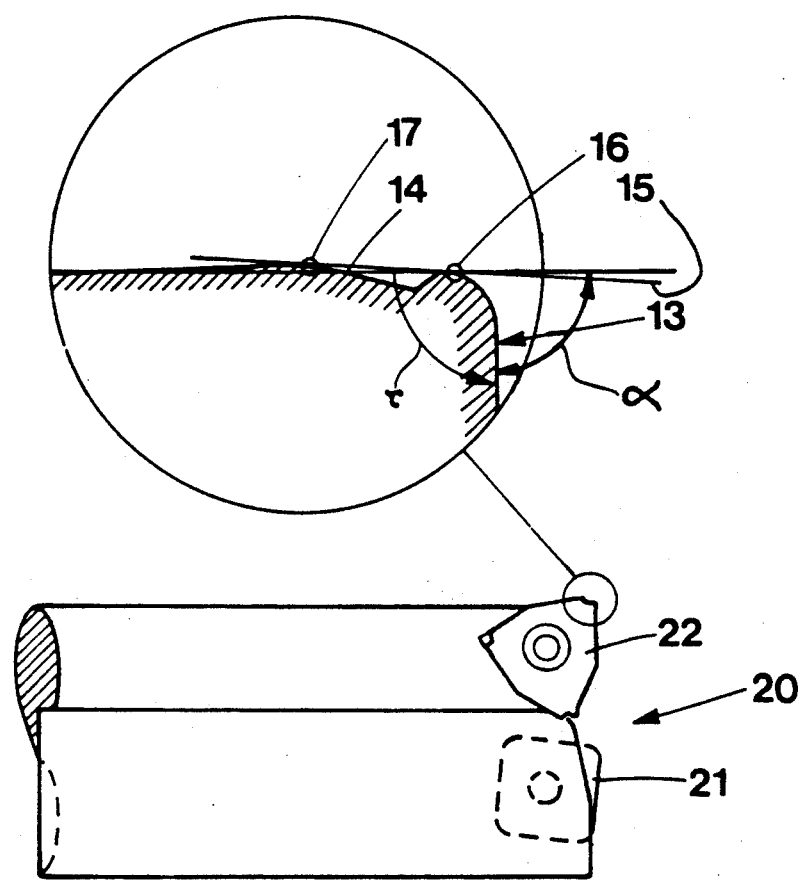
FIG. 7 shows a cutting insert according to the invention mounted in a short hole drill.

In the embodiment of FIG. 7 a short hole drill 20 is shown. The drill is provided with a radially inner cutting insert 21 and a radially outer cutting insert 22. A detail in an enlarged scale of the radially outer cutting insert 22 is shown in FIG. 7.

In a corresponding way to the embodiments described above the radially outer cutting insert 22 has a cutting corner including a main cutting edge 13 and a secondary cutting edge 14. The line that touches a point 16 in the cutting corner and passes through the end point 17 of the secondary cutting edge 14 that is located furthest away from the main cutting edge 13 is designated by 15 and denominated machining line.

The included angle between the main cutting edge 13 and the machining line 15 is denominated $\tau$. The setting angle is denominated $\alpha$. According to the invention the angle $\tau$ and the setting angle $\alpha$ together have a value within the interval 177°–210°, preferably 177°–195°.

The length of the machining line 15, between the points 16 and 17, is within the interval 0.1–4 mm, preferably 0.5–2 mm, e.g. 1 mm.

The invention is applicable both for positive and negative cutting inserts.

We claim:

1. A cutting insert for chip removal machining, including longitudinal turning, comprising upper and lower surfaces interconnected by side surface means to form at least one corner, an intersection of said side surface means and said upper surface forming an edge region including first and second edge portions, said first edge portion including a main cutting edge at least a portion of which is curved and extends around said corner, said first edge portion including a clearance portion extending from a terminal end of said main cutting edge lying on said curved portion generally toward a center axis of the insert, said second edge portion having an end situated adjacent said clearance portion and extending away from said clearance portion in a direction generally away from said center axis, said second edge portion intersecting a tangent line which is tangent to said terminal end of said main cutting edge and extending past such tangent line in a direction generally away from said center axis to define a secondary cutting edge located on a side of said tangent line which is opposite that of said main cutting edge, said secondary cutting edge extending to a terminal end thereof which is spaced from said terminal end of said main cutting edge by a distance of from 0.1 to 4.0 mm along a line interconnecting said terminal ends, whereby said main and secondary cutting edges are adapted to cut during chip removal machining, including longitudinal turning.

2. A cutting insert according to claim 1, wherein said distance between said terminal ends is from 0.5 to 2 mm.

3. A cutting insert according to claim 2, wherein said at least one corner includes a second corner, said straight portion of said main cutting edge extending substantially to said second corner.

4. A cutting insert according to claim 1, wherein said main cutting edge includes a straight portion extending from an end of said curved portion opposite said terminal end of said main cutting edge.

5. A cutting insert according to claim 1, including an additional clearance portion extending rearwardly from said terminal end of said secondary cutting edge to an additional cutting edge which extends away from said additional clearance portion in a direction generally away from said center axis.

6. A cutting insert according to claim 1, wherein said curved portion of said main cutting edge has a radius in the range of 0.2 to 3.2 mm.

7. A cutting insert according to claim 1, wherein said said terminal end of said secondary cutting edge is spaced from said tangent line by a distance less than 0.5 mm.

* * * * *